US011720673B2

(12) United States Patent
Kumar et al.

(10) Patent No.: US 11,720,673 B2
(45) Date of Patent: Aug. 8, 2023

(54) VISUAL CLASSIFICATION ACCORDING TO BINARY MEMORY DUMP

(71) Applicant: McAfee, LLC, San Jose, CA (US)

(72) Inventors: Brajesh Kumar, Bangalore (IN); Sumit Lohani, Bangalore (IN); Sidney Da Santa Rita Gomindes, Bangalore (IN); Muralivardhan R. Pannala, Fremont, CA (US)

(73) Assignee: McAfee, LLC, San Jose, CA (US)

( * ) Notice: Subject to any disclaimer, the term of this patent is extended or adjusted under 35 U.S.C. 154(b) by 261 days.

(21) Appl. No.: 17/033,445

(22) Filed: Sep. 25, 2020

(65) Prior Publication Data

US 2022/0100855 A1  Mar. 31, 2022

(51) Int. Cl.
  *G06F 21/56*  (2013.01)
  *G06F 21/53*  (2013.01)
  *G06N 3/02*  (2006.01)
  *G06F 9/455*  (2018.01)
  *G06F 21/51*  (2013.01)

(52) U.S. Cl.
  CPC ........ *G06F 21/562* (2013.01); *G06F 9/45558* (2013.01); *G06F 21/51* (2013.01); *G06F 21/53* (2013.01); *G06N 3/02* (2013.01); *G06F 2009/45587* (2013.01)

(58) Field of Classification Search
  None
  See application file for complete search history.

(56) References Cited

U.S. PATENT DOCUMENTS

| 10,089,461 | B1 * | 10/2018 | Ha | G06F 21/56 |
| 2008/0028388 | A1 * | 1/2008 | Burtscher | G06F 21/566 717/162 |
| 2008/0040710 | A1 * | 2/2008 | Chiriac | G06F 21/566 717/136 |
| 2010/0077476 | A1 * | 3/2010 | Adams | H04L 63/145 726/22 |
| 2017/0300691 | A1 * | 10/2017 | Upchurch | G06F 21/12 |
| 2019/0042743 | A1 * | 2/2019 | Chen | G06N 20/00 |
| 2019/0173946 | A1 * | 6/2019 | Varma | H04L 67/52 |

* cited by examiner

*Primary Examiner* — William J. Goodchild
(74) *Attorney, Agent, or Firm* — Patent Capital Group

(57) ABSTRACT

There is disclosed in one example a method of detecting computer malware, including: receiving a binary object for analysis; allocating the binary object to a sandbox; within the sandbox, loading the binary object into an executable memory region; performing a memory dump of the executable memory region; and analyzing the memory dump for malware characteristics.

19 Claims, 16 Drawing Sheets

VISUAL CLASSIFICATION ACCORDING TO BINARY MEMORY DUMP

FIELD OF THE SPECIFICATION

This application relates in general to computer security, and more particularly, though not exclusively, to providing visual classification according to binary memory dump.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
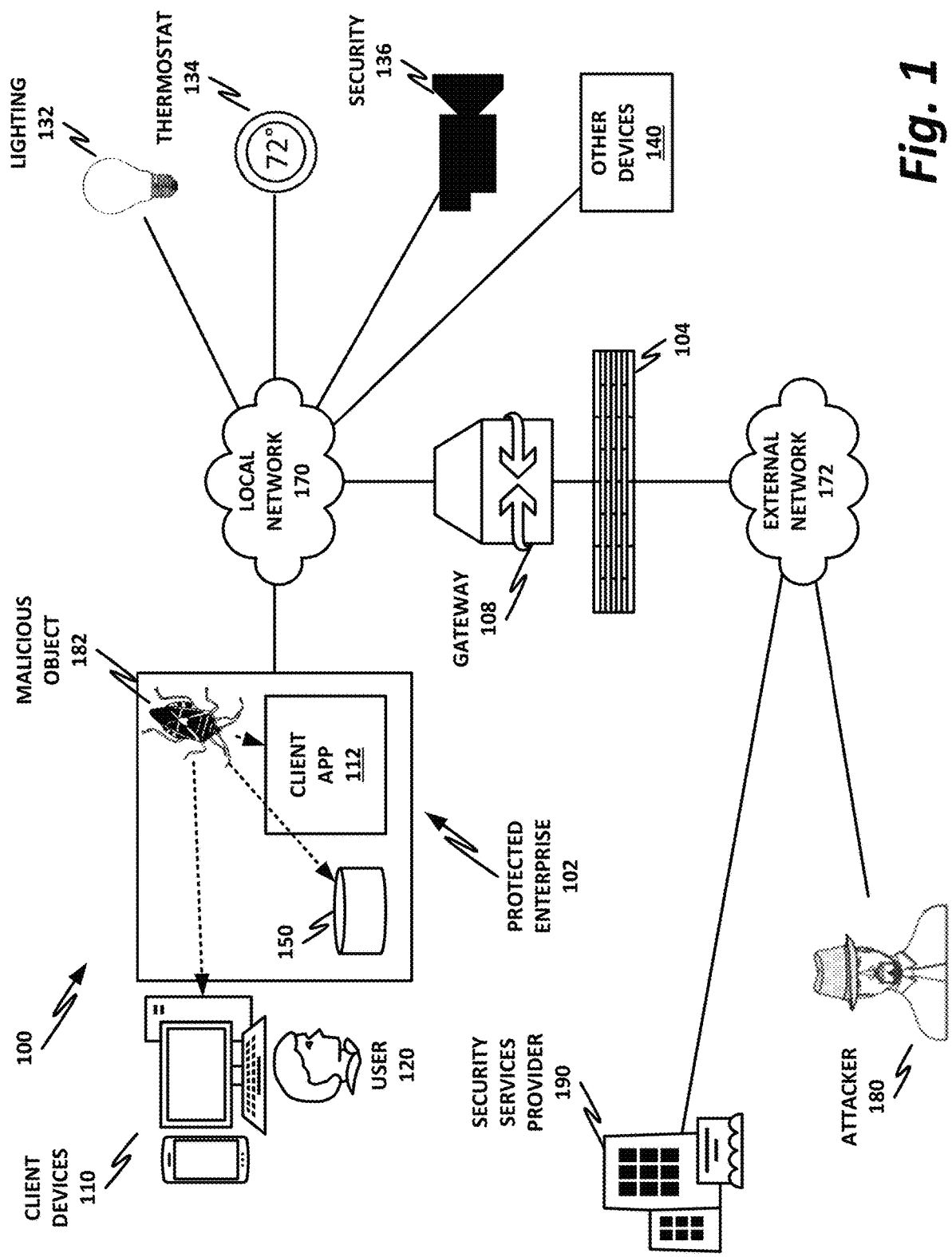
FIG. 1 is a block diagram of selected elements of a security ecosystem.

In an example, there is disclosed a method of detecting computer malware, comprising: receiving a binary object for analysis; allocating the binary object to a sandbox; within the sandbox, loading the binary object into an executable memory region; performing a memory dump of the executable memory region; and analyzing the memory dump for malware characteristics.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The exponential growth of new malware objects is a substantial concern for security services providers. A provider may have a very short window to identify and classify a malware object before that object is able to do destructive work on a computer system. When the number of objects grows exponentially, it becomes a difficult problem for anti-malware systems to quickly identify and classify the objects before they can do destructive work.

One useful technique in the modern toolkit of a security services provider is the deployment of neural networks and other artificial intelligence systems. For example, a convolutional neural network (CNN) may be programmed to convert a newly identified binary object into an image file, such as by converting it to a byte stream of 8-bit vectors. These 8-bit vectors may be treated as a grayscale bitmap object, with each byte representing a grayscale value between 0 and 255. The object may be converted into a series of lines, with each line having a fixed length such as, for example, 128 or 256 bytes. A CNN can be programmed to "look" at this binary image file, and can then tell literally "at a glance" whether the object is a malware file, and if it is a malware file, what class of malware it belongs to.

This can be accomplished because the CNN has been previously trained on a large set of known malware objects that have been previously classified. Because malware authors use a common set of toolkits, techniques, code bases, and other shared resources, similar malware objects look—to a computer vision system—like similar pictures. Thus, just as a neural network can be trained to differentiate a puppy from a parakeet, it can be trained to differentiate a malware object from a benign object, and also to classify malware objects into a number of categories.

This computer vision-based method may realize advantages over some existing systems, which may rely, for example, on static and/or behavioral analysis. These methods are less efficient in some cases, and also have a difficult time identifying packed or highly-encrypted portable executable (PE) files, or may require more time to analyze behavior.

A PE file is the Microsoft portable executable file format. It is a format for executable or dynamic link library (DLL) files based on the common object file format (COFF) specification. PE is an architecture-independent file format for 32-bit and 64-bit Windows operating systems.

The visualization or image processing technique can be used to visualize the features of a PE file in a grayscale image. The use of grayscale images for malware classification is fast, scalable, and efficient. However, the PE file format also provides the ability to highly compress or even encrypt a file before it is shipped. For example, the PE format may compress and encrypt a file, and include the encryption key within the file itself. While it is fairly trivial for Windows to extract the encryption key, decrypt, and decompress the file before running it, this method of packing can cause difficulties for computer vision-based systems. Once these files are compressed and encrypted, their binary properties change so that they no longer "look" to a computer vision system like similar files in the same family. Thus, rather than attempting to directly obfuscate malware code (which can still be susceptible to computer vision techniques), modern malware authors may rely heavily on packers to transform an executable binary into another form so that it appears different from the original. This means that even packages that share code bases, tool chains, APIs, and other resources no longer visually appear similar to the CNN.

However, the use of a packer to compress and/or encrypt a file has a weakness that a system of the present specification may exploit. Specifically, to be able to do the destructive work of the malware, the packer must be able to decrypt and decompress the file onto the target system. Indeed, if the unpacking and decrypting are not essentially trivial, then it is unlikely that the malware object will be successfully deployed. Many malware objects rely substantially on users being relatively unwary or unobservant. Any extra steps or extra effort to unpack and decrypt the file may defeat this approach by raising the user's level of awareness. Thus, it has been found that the large majority of malware files, even those that are compressed and encrypted, are compressed and encrypted in such a way that they can be decompressed and decrypted with almost no user interaction. Instead, the packed executable is simply automatically unpacked by the Windows operating system, and then runs in memory. The decompressed and decrypted version of the original file is then loaded into main memory.

Thus, a computer vision system of the present specification may defeat malware samples that use packers by first loading the object into a sandboxed environment. Once the object is loaded into the sandbox, the operating system within the sandbox decompresses and/or decrypts the file according to its normal unpacking procedures. The decompressed and decrypted object is then loaded into the main memory of the sandbox. Once the object is loaded into main memory, a process running on the sandbox may then identify the target object and perform a memory dump, such as a core dump or other memory snapshot operation. This provides a binary image of the object as it has been loaded into main memory, ready to execute. Once a binary image of the object, as it is intended to execute, has been obtained, a neural network may then operate on it. As before, the object may be converted to an image file, such as an 8-bit vector, with each series of bytes being treated as a line in a grayscale bitmap image. A computer vision system may then observe the memory dump as converted to a grayscale image, and perform the classification as previously described. This enables the system to usefully identify and classify the object.

As discussed above, packing transforms a file, such as a PE image, from its original image so that it can be harder to identify by a computer vision system. However, the use of a core dump (dump.bin) instead of the original binary image provides improved results. The dump.bin is a file that is obtained once the executable is loaded into main memory in the sandboxed environment.

One benefit of this method is that it exploits a weakness in packers. Packers must unpack the object into memory before it can be useful. Thus, once the packer runs, the decompressed version of the original file may be dumped as loaded into the computer memory.

The dump.bin file may then be used instead of the binary, itself, as an input for visualization or image processing techniques. This solution can classify unknown, packed malware objects by extracting the memory dump of a file in applying visualization techniques.

The foregoing can be used to build or embody several example implementations, according to the teachings of the present specification. Some example implementations are included here as nonlimiting illustrations of these teachings.

There is disclosed in one example a method of detecting computer malware, comprising: receiving a binary object for analysis; allocating the binary object to a sandbox; within the sandbox, loading the binary object into an executable memory region; performing a memory dump of the executable memory region; and analyzing the memory dump for malware characteristics.

There is further disclosed an example method, wherein analyzing the memory dump comprises artificial intelligence analysis.

There is further disclosed an example method, wherein the artificial intelligence analysis comprises computer vision.

There is further disclosed an example method, wherein the artificial intelligence analysis further comprises neural network analysis.

There is further disclosed an example method, further comprising converting the memory dump to an image.

There is further disclosed an example method, wherein the image is an 8-bit grayscale image.

There is further disclosed an example method, wherein converting the memory dump to an image comprises converting the memory to an 8-bit vector format.

There is further disclosed an example method, wherein the sandbox runs a native operating system of the binary object.

There is further disclosed an example method, wherein loading the binary object into the executable memory region comprises operating an unpacker.

There is further disclosed an example method, wherein the unpacker is an operating system-native unpacker.

There is further disclosed an example method, wherein the binary object is a Windows portable executable (PE).

There is further disclosed an example method, wherein the binary object is a Unix or Linux executable and linkable format (ELF) file.

There is further disclosed an example method, wherein the binary object is a Macintosh Mach-O file.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed an example computing system, comprising: a processor; a memory; and instructions encoded within the memory to instruct the processor to: receive a malware sample for analysis; cause a sandbox to receive the malware sample, unpack the malware sample into a local memory of the sandbox, and dump the malware sample to a binary memory image; cause the binary memory image to be converted to an image file; and cause a neural network to visually inspect the image file.

There is further disclosed an example computing system, wherein the visual inspection of the image file by the neural network comprises artificial intelligence analysis.

There is further disclosed an example computing system, wherein the artificial intelligence analysis comprises computer vision.

There is further disclosed an example computing system, wherein the image file is an 8-bit grayscale image.

There is further disclosed an example computing system, wherein converting the binary memory image to an image file comprises converting the binary memory image to an 8-bit vector format.

There is further disclosed an example computing system, wherein the sandbox runs a native operating system of the malware sample.

There is further disclosed an example computing system, wherein unpacking the malware sample into the local memory comprises operating an unpacker.

There is further disclosed an example computing system, wherein the unpacker is an operating system-native unpacker.

There is further disclosed an example computing system, wherein the binary object is a Windows portable executable (PE).

There is further disclosed an example computing system, wherein the binary object is a Unix or Linux executable and linkable format (ELF) file.

There is further disclosed an example computing system, wherein the binary object is a Macintosh Mach-O file.

There is also disclosed an example malware analysis system, comprising: a hardware platform; a guest infrastructure to run on the hardware platform; a first guest to operate on the guest infrastructure and provide a sandbox, the sandbox including instructions to receive an object file, extract the object file into guest memory, and dump the memory to a binary image; and a second guest to operate on the guest infrastructure and provide an analyzer, the analyzer including instructions to visually analyze the binary image according to an artificial intelligence subroutine.

There is further disclosed an example malware analysis system, wherein the sandbox is a virtual machine.

There is further disclosed an example malware analysis system, wherein the virtual machine is a Windows virtual machine.

There is further disclosed an example malware analysis system, wherein the guest infrastructure provides containerization.

There is further disclosed an example malware analysis system, wherein the sandbox includes a virtual machine and the analyzer includes a container.

There is further disclosed an example malware analysis system, wherein visually analyzing the binary image according to the artificial intelligence subroutine comprises computer vision.

There is further disclosed an example malware analysis system, wherein visually analyzing the binary image according to the artificial intelligence subroutine further comprises neural network analysis.

There is further disclosed an example malware analysis system, wherein the binary image is an 8-bit grayscale image.

There is further disclosed an example malware analysis system, wherein dumping the memory to a binary image comprises converting the memory to an 8-bit vector format.

There is further disclosed an example malware analysis system, wherein the sandbox runs a native operating system of the object file.

There is further disclosed an example malware analysis system, wherein extracting the object file into the guest memory comprises operating an unpacker.

There is further disclosed an example malware analysis system, wherein the unpacker is an operating system-native unpacker.

There is further disclosed an example malware analysis system, wherein the binary object is a Windows portable executable (PE).

There is further disclosed an example malware analysis system, wherein the binary object is a Unix or Linux executable and linkable format (ELF) file.

There is further disclosed an example malware analysis system, wherein the binary object is a Macintosh Mach-O file.

A system and method for providing visual classification according to binary memory dump will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190. Security services provider 190 could operate, for example, a cloud service. The cloud service could include a service for detecting and/or classifying malicious or suspect objects. Such a cloud service could be implemented using the teachings of the present specification, for example by providing one or more appliances and/or virtual machines that are configured to provide the features of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone Internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. Security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
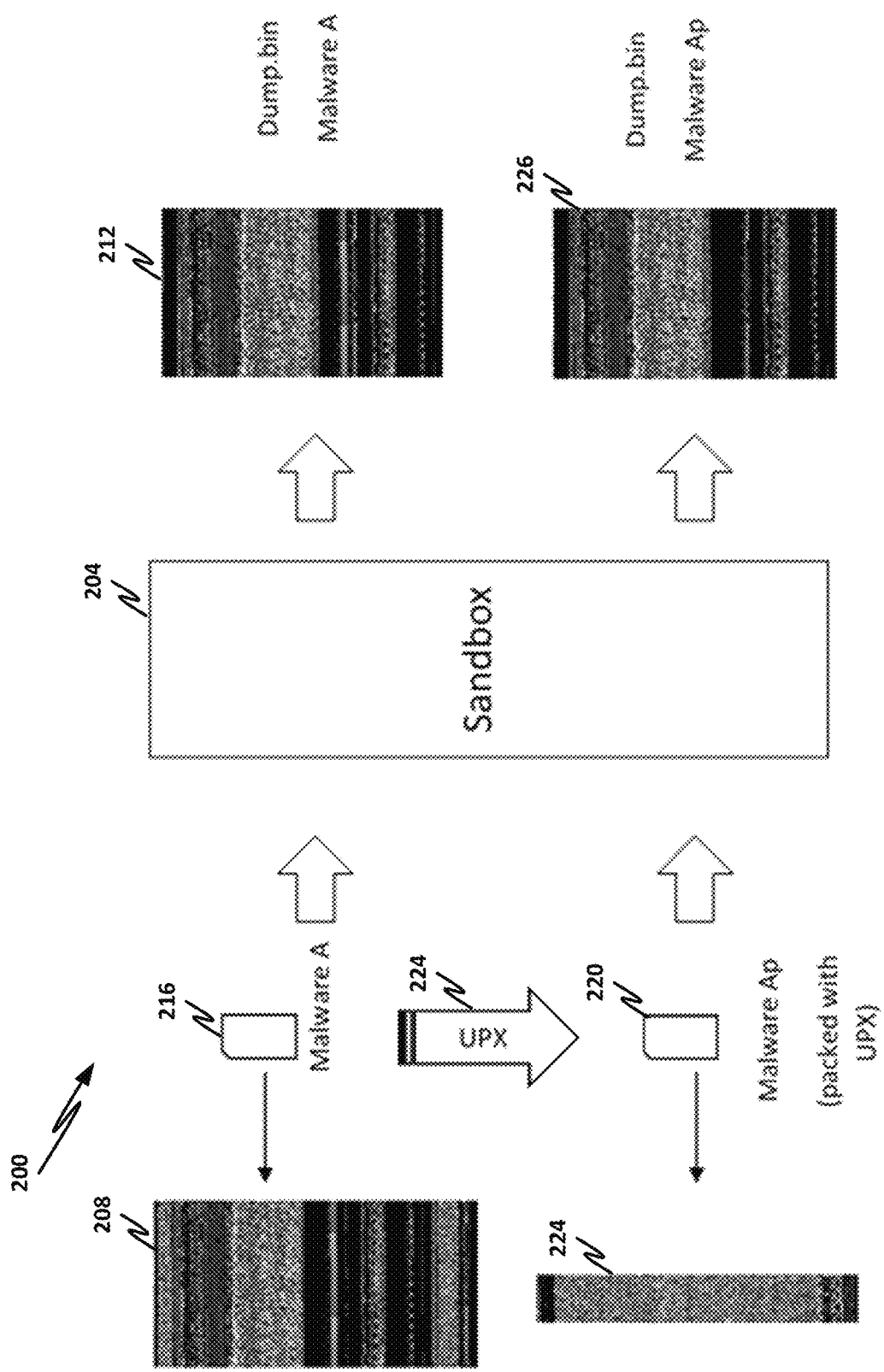
FIG. 2 is a block diagram of a malware analysis ecosystem.

FIG. 2 is a block diagram of a malware analysis ecosystem 200. Malware analysis ecosystem 200 includes a sandbox 204. Sandbox 204 may include a target operating system, such as Microsoft Windows, or some other operating system that may be the target of a malware attack.

In an illustrative example, sandbox 204 may need to analyze a malware object, such as malware A 216. If malware A 216 is converted to an 8-bit vector, with rows of 128 bytes each, a grayscale image such as image 208 may be provided. This grayscale image may include certain features that can be recognized by an artificial intelligence or machine learning system, such as a CNN. Such a neural network may be operable to classify malware A 216 according to binary image 208, by recognizing those features and assigning malware A 216 to an appropriate malware class.

However, to make detection more difficult, the author of malware A 216 may run malware A through a packer 224. Packer 224 may be a legitimate packer that is used by an operating system, such as Microsoft Windows, to compress, sign, and/or encrypt an executable object. The result of this packing is malware $A_p$ 220, packed with Ultimate Packer for Executables (UPX) 224. Malware $A_p$ 220 is a binary object, and may also be converted to a grayscale image, as illustrated in FIG. 2. However, even a trivial human comparison of grayscale image 224 to grayscale image 208 will make it obvious that it will be difficult or impossible for a neural network trained on images like grayscale image 208 to recognize or classify image 224. In the process of packing and encrypting, much of the relevant data and information are lost to the image. Furthermore, even small changes to malware A 216 can generate very significant changes to malware $A_p$ 220. When an object is compressed and encrypted, minor changes can result in significant differences. Thus, even if the malware author uses common tool chains, APIs, packages, and/or kits, those can be obfuscated by packer 224.

Thus, simply analyzing an image of malware $A_p$ 220 may not be an effective way of classifying the object.

In some embodiments, direct analysis may be available for objects like malware A 216, which can be recognized and identified as standard uncompressed and unencrypted binary objects. However, any object that is identified as a compressed and/or encrypted object, such as a Windows PE, is instead provided to sandbox 204.

Sandbox 204 receives the malware sample, and loads it into memory. If malware A 216 is provided to sandbox 204, then the executable can be loaded directly into memory. A daemon, process, or subroutine running on sandbox 204 may then dump the memory to a file such as dump.bin, for example via a core dump. This provides a binary image of the object as it is executing in memory.

The dump.bin can then be converted to a grayscale image, such as image 212. Comparing image 212 to image 208, it is observable that the image is nearly identical. Thus, a well-trained neural network may have little trouble classifying it "malware A," whether it is provided directly as image 208, or by way of a core dump via image 212.

However, a great difference is observed in the case of malware $A_p$ 220. Malware $A_p$ 220 is provided to sandbox 204. If malware $A_p$ is a Windows PE, then an unpacker running within sandbox 204 may first unpack the PE. This unpacker may be a native component of the Windows operating system, or of some other operating system. The unpacker takes the compressed malware object provided as a PE, decrypts as necessary, unpacks as necessary, and loads the object into memory. Note that in some cases, all these operations are performed directly in memory, so that an uncompressed and unpacked version of malware $A_p$ 220 is not stored on the disk. However, for the instructions to usefully execute, they must be loaded into memory. Thus, at some point, the unpacker within sandbox 204 generates an unpacked, uncompressed image of the executable instruction sequence within the memory of sandbox 204. Once this sequence has been unpacked and uncompressed, then a daemon or process running on sandbox 204 may perform a core dump, or some other memory imaging operation. This provides a binary image of the uncompressed and unencrypted version of malware $A_p$ 220. This dump.bin file can then also be converted to a grayscale image, such as by vectorizing it to an 8-bit vector of 128 bytes per row, and treating the vector as a bitmap. As can be seen in this illustration, binary image 226 is more easily recognizable than binary image 224. For example, binary image 226 is much more similar to binary image 208 than binary image 224.

Because this image has been decompressed, unpacked, and decrypted, a malware analysis engine with a machine learning algorithm can operate on binary image 226, and can usefully analyze, categorize, and/or classify malware $A_p$ 220 via binary image 226.

Figure 3:
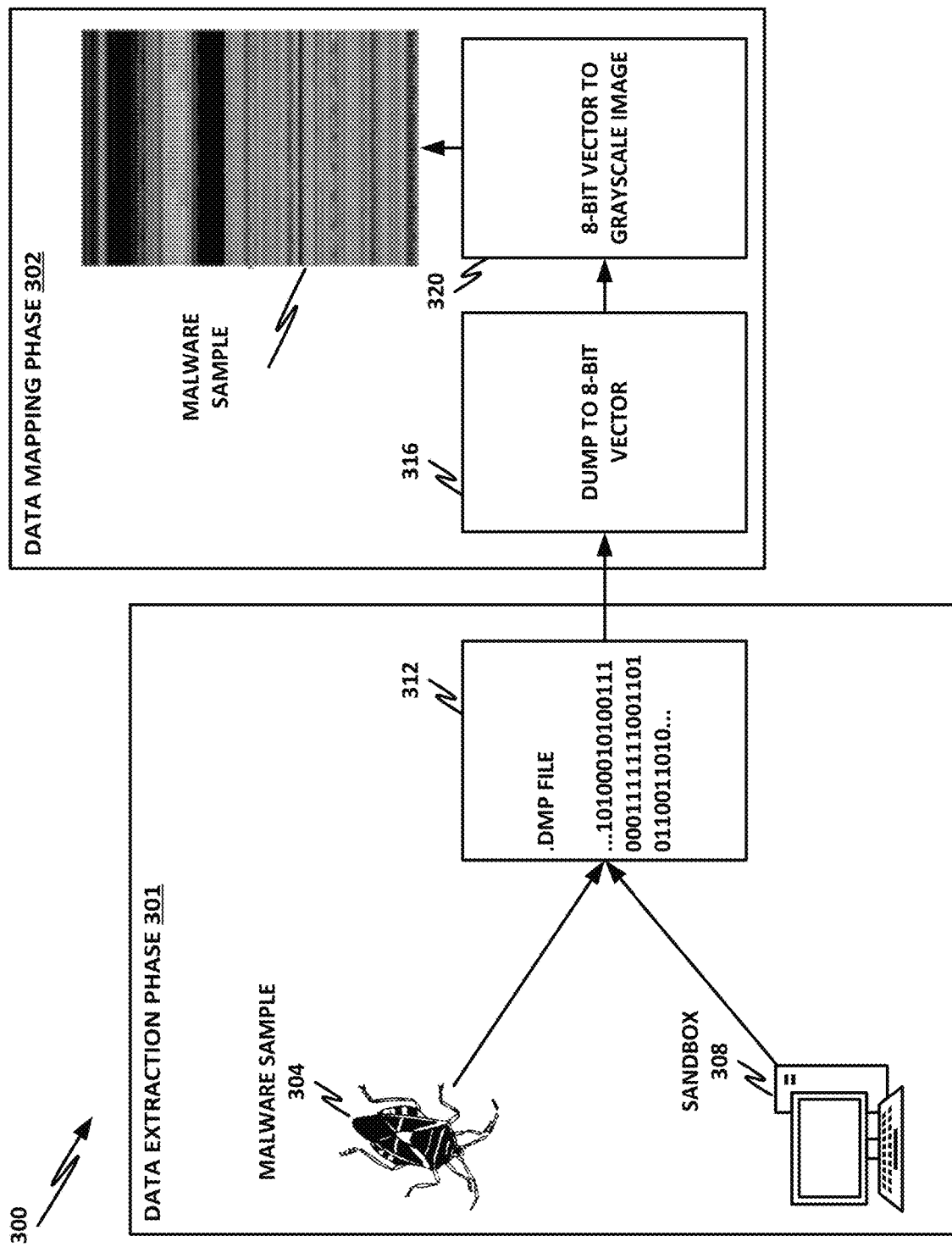
FIG. 3 is a phase diagram of the teachings of the present specification.

FIG. 3 is a phase diagram of the teachings of the present specification. The phase diagram of FIG. 3 may, for example, implement an algorithm that may be implemented in hardware, software, and/or firmware according to the teachings of the present specification. Phase diagram 300 includes a data extraction phase 301 and a data mapping phase 302.

In data extraction phase 301, a malware sample 304 is provided to a sandbox 308. Sandbox 308 may include an instance of an operating system-native to malware sample 304, such as an operating system that malware sample 304 is intended to run on.

Sandbox 308 uses an unpacker, which may be native to the operating system, to unpack malware sample 304 and load it into memory. Sandbox 308 then creates a dump file, here illustrated as .DMP file 312.

.DMP file 312 is a binary file that includes a snapshot of malware sample 304, not necessarily in its original format, but rather in the format that it would have run if it were executed in memory. Note that sandbox 308 does not need to necessarily execute through malware sample 304. In some cases, the sample is simply unpacked and loaded into memory, and then core dumped either immediately or after a short time that gives the program time to initialize. The teachings of the present specification are compatible with behavioral analysis, and behavioral analysis is often used in sandboxed environments to analyze a malware object according to its behavior. However, the teachings of the present specification do not require a parallel behavioral analysis. Rather, the machine learning network can analyze a binary image of the object, regardless of whether a behavioral analysis is performed in addition. Thus, it is not necessary to execute all the way through malware sample 304. Rather, it is desirable to load malware object 304 into memory in its uncompressed, native form where it is ready to execute, and then to capture a binary image of the object in that form.

In data mapping phase 302, .DMP file 312 is dumped to an 8-bit vector 316.

In block 320, the 8-bit vector is converted to an 8-bit grayscale image, such as an image with 128 bytes per row. Finally, the end result is an 8-bit grayscale image in a format suitable for analysis by the machine learning network.

Figure 4:
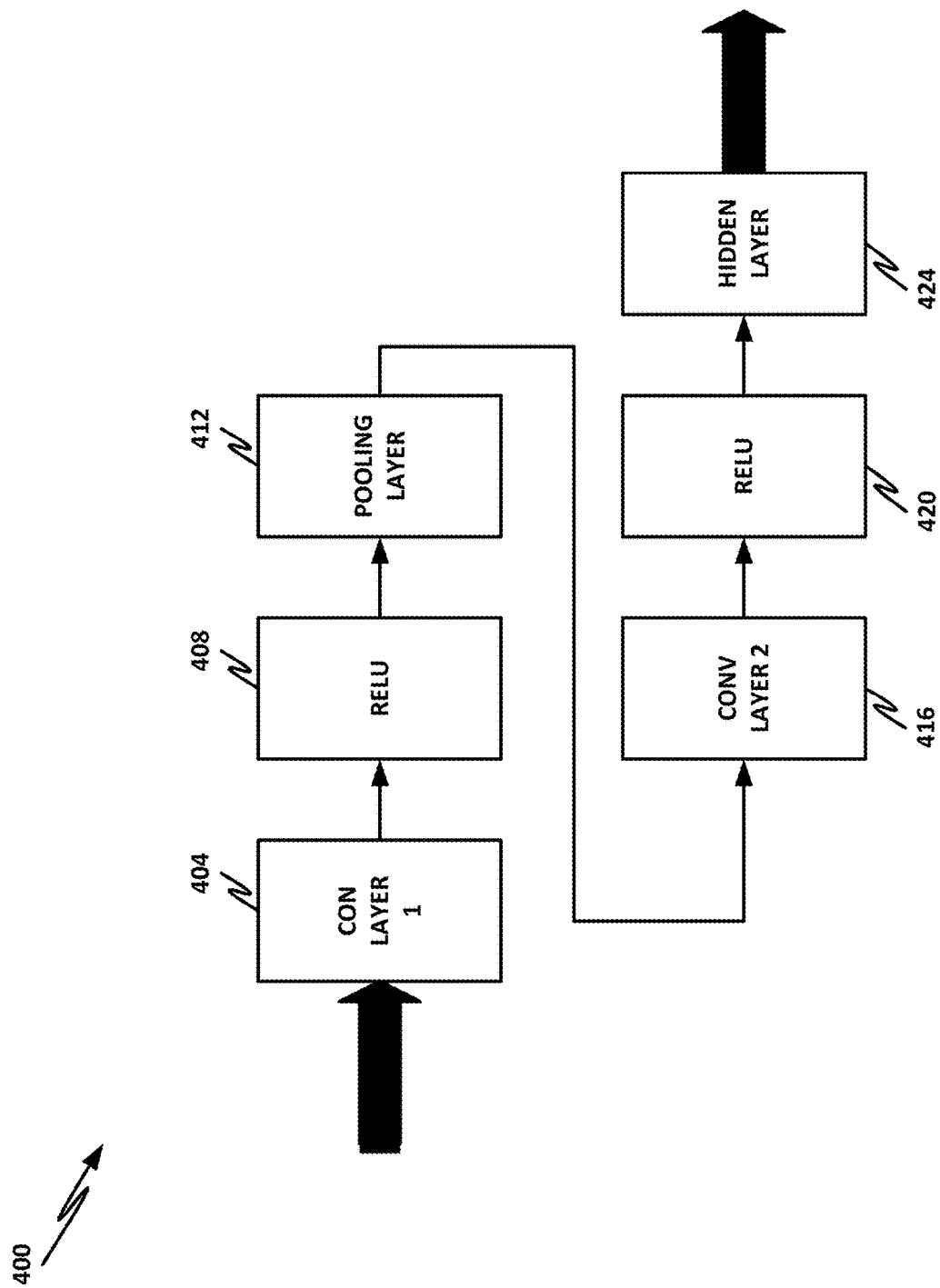
FIG. 4 is a pipeline diagram of a neural network.

FIG. 4 is a pipeline diagram 400 of a neural network. This neural network may be used, for example, to analyze a grayscale image provided according to the teachings of the present specification. For example, pipeline 400 could be used to analyze malware sample 304 from FIG. 3, or some other malware sample.

Malware pipeline 400 includes convolution layer 1 404, rectified linear unit (RELU) 408, pooling layer 412, convolution layer 2 416, RELU 420, and hidden layer 424.

In an illustrative example, convolution layer 1 404 may be configured with the following properties:
kernel_size=(3, 3)
activation='relu'
Convolution layer 2 416 may be configured as:
kernel_size=(3, 3),
activation='relu'
MaxPooling2D (pool_size=(2, 2))
Dropout (0.25)
Hidden layer 3 may have the following properties:
Dense layer
activation='relu'
Dropout(0.5)
Finally, the output may be provided as:
activation='softmax'

Figure 5:
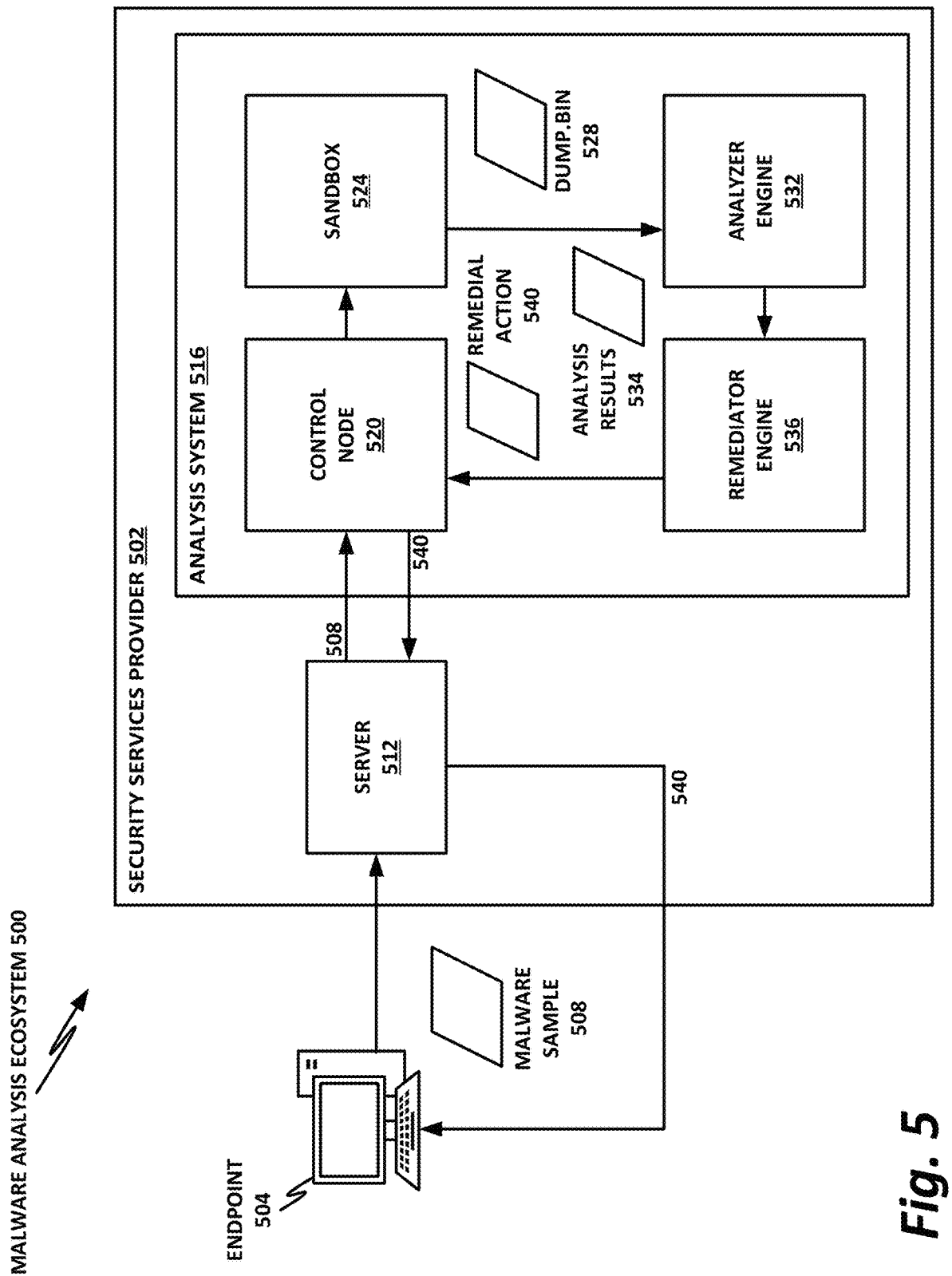
FIG. 5 is a block diagram illustrating selected elements of a malware analysis ecosystem.

FIG. 5 is a block diagram illustrating selected elements of a malware analysis ecosystem 500.

Malware analysis ecosystem 500 includes an endpoint 504. According to a configured policy, endpoint 504, or a server within a protected enterprise, may identify an object that is known malware that is to be classified, or an object that is unknown that is to be assigned a reputation such as "green" (allow on the enterprise), "red" (block), or "yellow" (suspicious, but not known malicious). Endpoint 504 provides a malware sample 508 to a server 512. Server 512 is a gateway or entry point between endpoint 504 and analysis system 516. Server 512 may be operated, for example, by a security services provider 502, which, in one illustrative example, may be an instance of security services provider 190 of FIG. 1.

Server 512 receives malware sample 508 and provides malware sample 508 to control node 520. Control node 520 provides malware sample 508 in its original format (which could be, for example, a Windows PE or similar file) to sandbox 424.

Sandbox 524 loads malware sample 508 into memory in its native executable format, and then performs a core dump or other memory imaging operation.

This yields a dump.bin file 528, which sandbox 524 provides to analyzer engine 532.

Analyzer engine 532 may include, for example, a computer vision system or other neural network that is configured to operate on bitmap files or binary images. Analyzer engine 532 vectorizes dump.bin 528 and converts it internally to an image file. The image file is then analyzed according to the computer vision capabilities of analyzer engine 532. Analyzer engine 532 then provides analysis results 534 to remediator engine 536. Remediator engine 536 may determine a remedial action 540 to be taken on endpoint 504, or within the protected enterprise. Remedial action 540 could include, for example, isolating the file, quarantining the file, shutting down endpoint 504, reimaging endpoint 504, closing off certain network interfaces and/or ports on endpoint 504, initializing a detailed security scan on endpoint 504, or taking similar action across a number of endpoints, or across the enterprise.

Control node 520 receives remedial action 540 and provides remedial action 540 to server 512. Server 512 then pushes remedial action 540 out to endpoint 504, or to an enterprise security controller or other node, which is expected to implement the remedial action 540.

Figure 6:
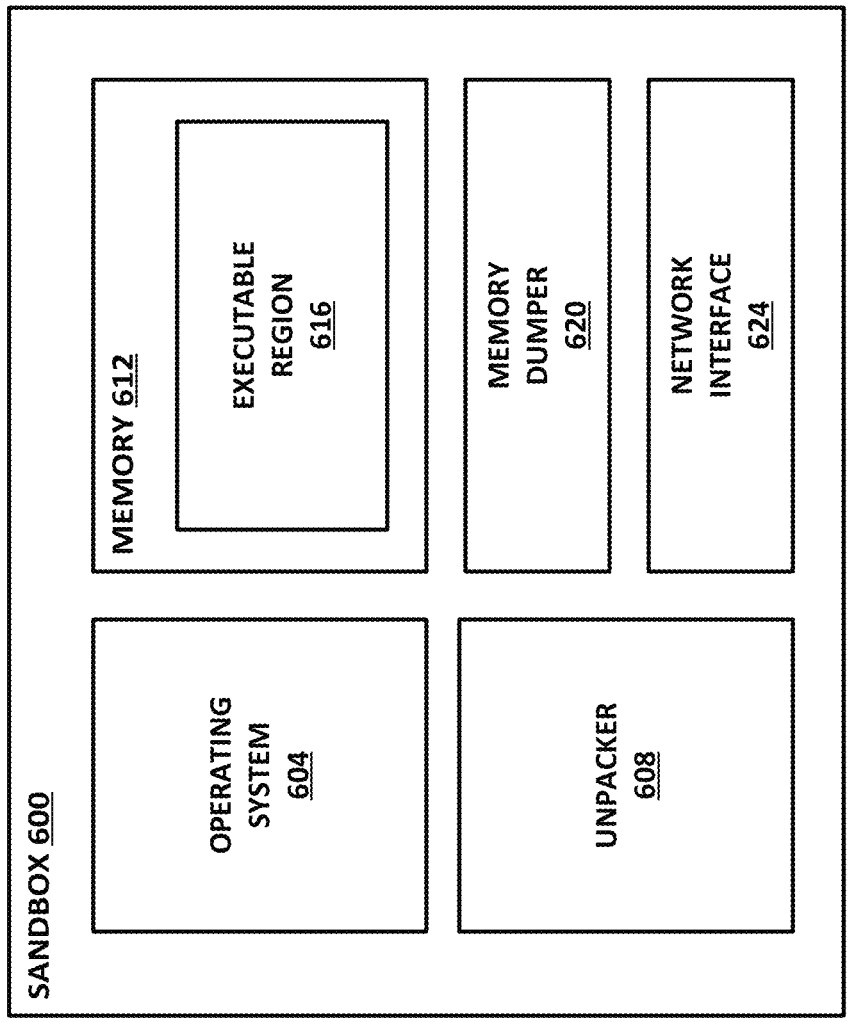
FIG. 6 is a block diagram of a sandbox.

FIG. 6 is a block diagram of a sandbox 600. Sandbox 600 may include capabilities for loading a malware object, including an object in a compressed, signed, and/or encrypted format such as a PE.

Sandbox 600 includes an operating system 604. Operating system 604 may be an operating system that is targeted by the malware object, such as Microsoft Windows, Mac OS X or similar, iOS, Linux, Unix, Android, or some other target operating system.

Operating system 604 includes an unpacker 608, which has the ability to load a packed executable file into memory 612, specifically into an executable region 616 of memory 612. Unpacker 608 receives the PE file and loads it into executable region 616 of memory 612. A memory dumper 620 may monitor this process, and determine when unpacker 608 has successfully loaded the PE into executable region 616. Once the PE is loaded, memory dumper 620 may take a snapshot of the memory, perform a core dump, terminate the process, or take some other action.

Sandbox 600 also includes a network interface 624, which memory dumper 620 can use to export the dumped memory image to an analysis engine.

Figure 7:
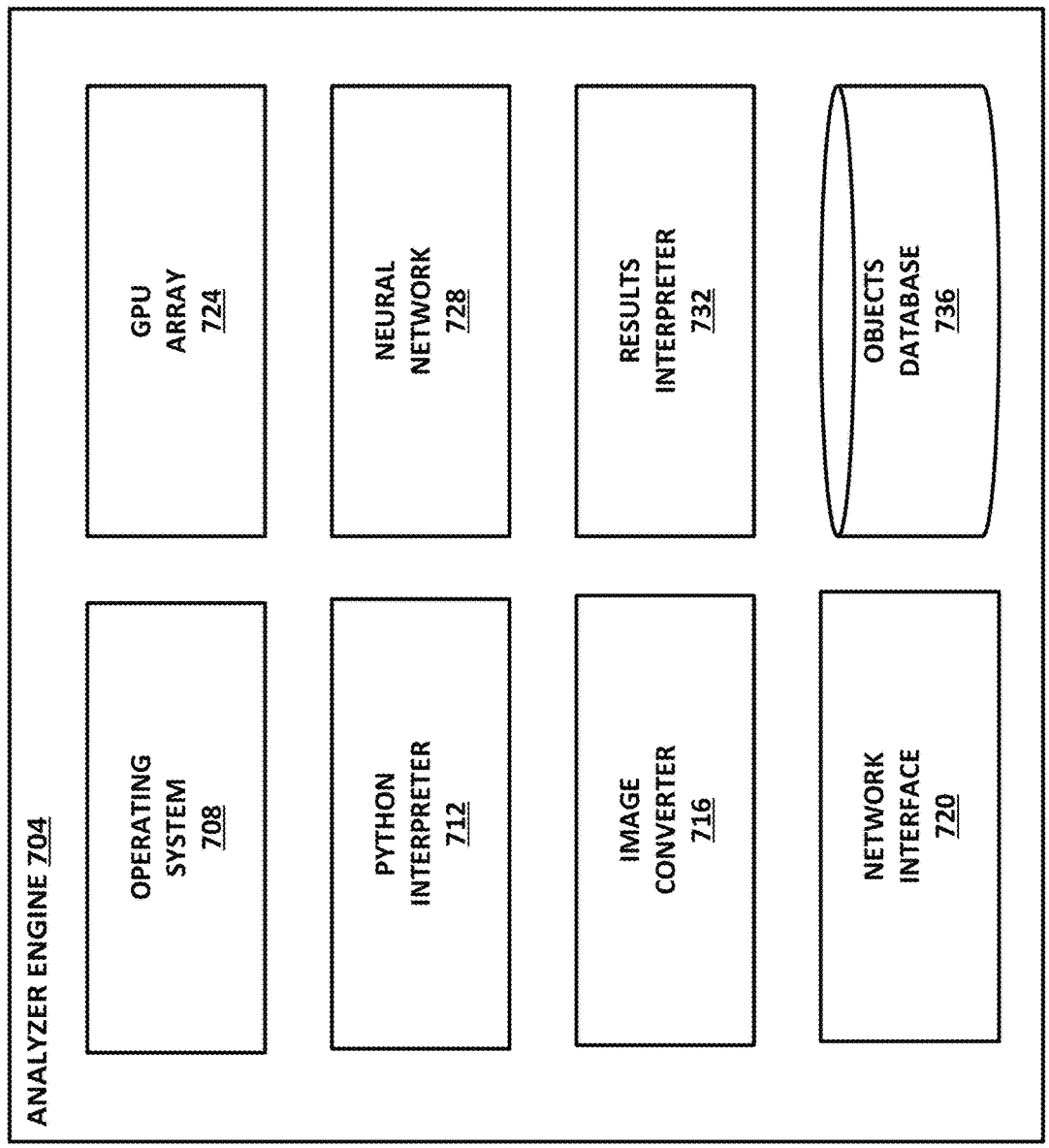
FIG. 7 is a block diagram of an analyzer engine.

FIG. 7 is a block diagram of an analyzer engine 704. Analyzer engine 704 may be configured to provide analysis services, such as via a neural network.

Note that analyzer engine 704 is illustrated here as a single modular object, but in some cases, different aspects of analyzer engine 704 could be provided by separate hardware, or by separate guests (e.g., virtual machines or containers) on a hardware system.

Analyzer engine 704 includes an operating system 708. Commonly, operating system 708 is a Linux operating system, although other operating systems, such as Microsoft Windows, Mac OS X, or similar could be used. Analyzer engine 704 also includes a Python interpreter 712, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

Image converter 716 receives the raw binary image after it has been dumped by a sandbox from memory, converts it to an 8-bit vector, and then to a grayscale bitmap image. Graphics processing unit (GPU) array 724 may include an array of graphics processing units that may be used to carry out the neural network functions of neural network 728. Note that GPU arrays are a popular choice for this kind of processing, but neural networks can also be implemented in central processing units (CPUs), or in application-specific integrated circuits (ASICs) or field-programmable gate arrays (FPGAs) that are specially designed to implement the neural network.

Neural network 728 includes the actual code for carrying out the neural network, and as mentioned above, is commonly programmed in Python.

Results interpreter 732 may include logic separate from the neural network functions that can be used to operate on the outputs of the neural network to assign the object for particular classification, perform additional analysis, and/or provide a recommended remedial action.

Objects database 736 may include a database of known malware objects and their classifications. Neural network 728 may initially be trained on objects within objects database 736, and as new objects are identified, objects database 736 may be updated with the results of additional neural network analysis.

Once final results have been obtained, the results may be sent to an appropriate destination via network interface 720.

Figure 8:
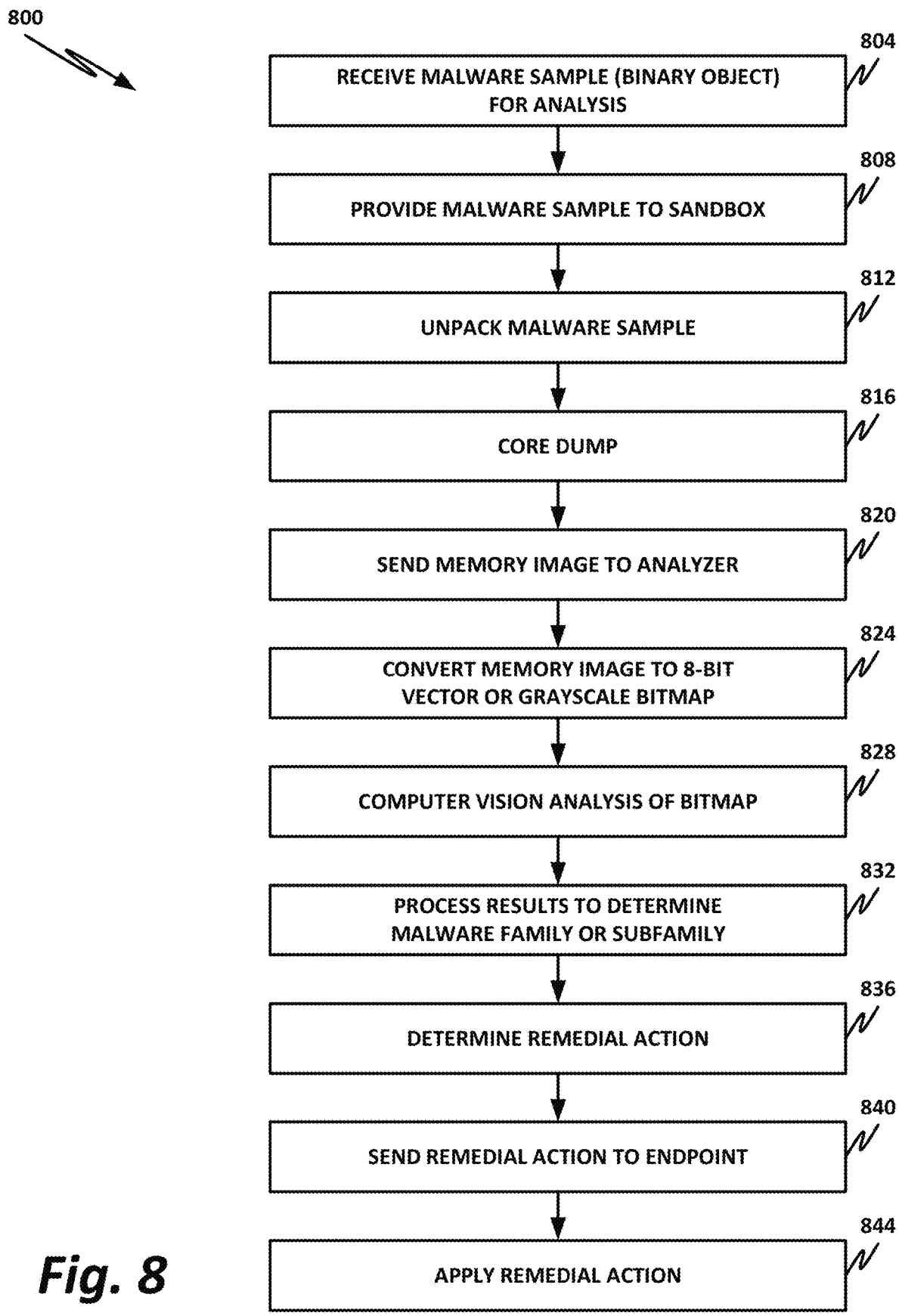
FIG. 8 is a flowchart of a method that performs malware analysis.

FIG. 8 is a flowchart of a method 800 that performs malware analysis. Note that various operations within method 800 are logically assigned to some of the modules illustrated throughout these FIGURES, such as some of the modules identified in FIG. 5. The division of labor between these operations and the various modules or software objects can be changed, according to the needs of a particular embodiment.

In block 804, the system receives a malware sample for analysis. This may be a binary object, and optionally, may be a compressed object such as a PE file, or similar.

In block 808, the object is provided to a sandboxed environment.

In block 812, within the sandbox an unpacker, such as a native operating system unpacker, unpacks the malware sample and loads it into memory, prepared to execute. Note that in some embodiments, it is not necessary to actually execute the file, but it is only necessary to load it into memory so that it is ready for execution.

In block 816, the sandbox or a process on the sandbox performs a core dump, or otherwise takes an image of the object as it exists in executable memory.

In block 820, the sandbox sends the memory image to the analyzer system.

In block 824, the analyzer system converts the image to an 8-bit vector, and then from that intermediate format, into a grayscale bitmap of an appropriate size.

In block 828, a neural network or other machine learning algorithm performs a computer vision analysis of the bitmap.

In block 832, the system processes the results to determine the malware family or subfamily that the malware object belongs to.

In block 836, the system may determine a remedial action that will ameliorate any damage that may be done by the malware object.

In block 840, the system sends the remedial action to the endpoint, or to the protected enterprise.

In block 844, the endpoint, or the protected enterprise, applies the remedial action.

Figure 9:
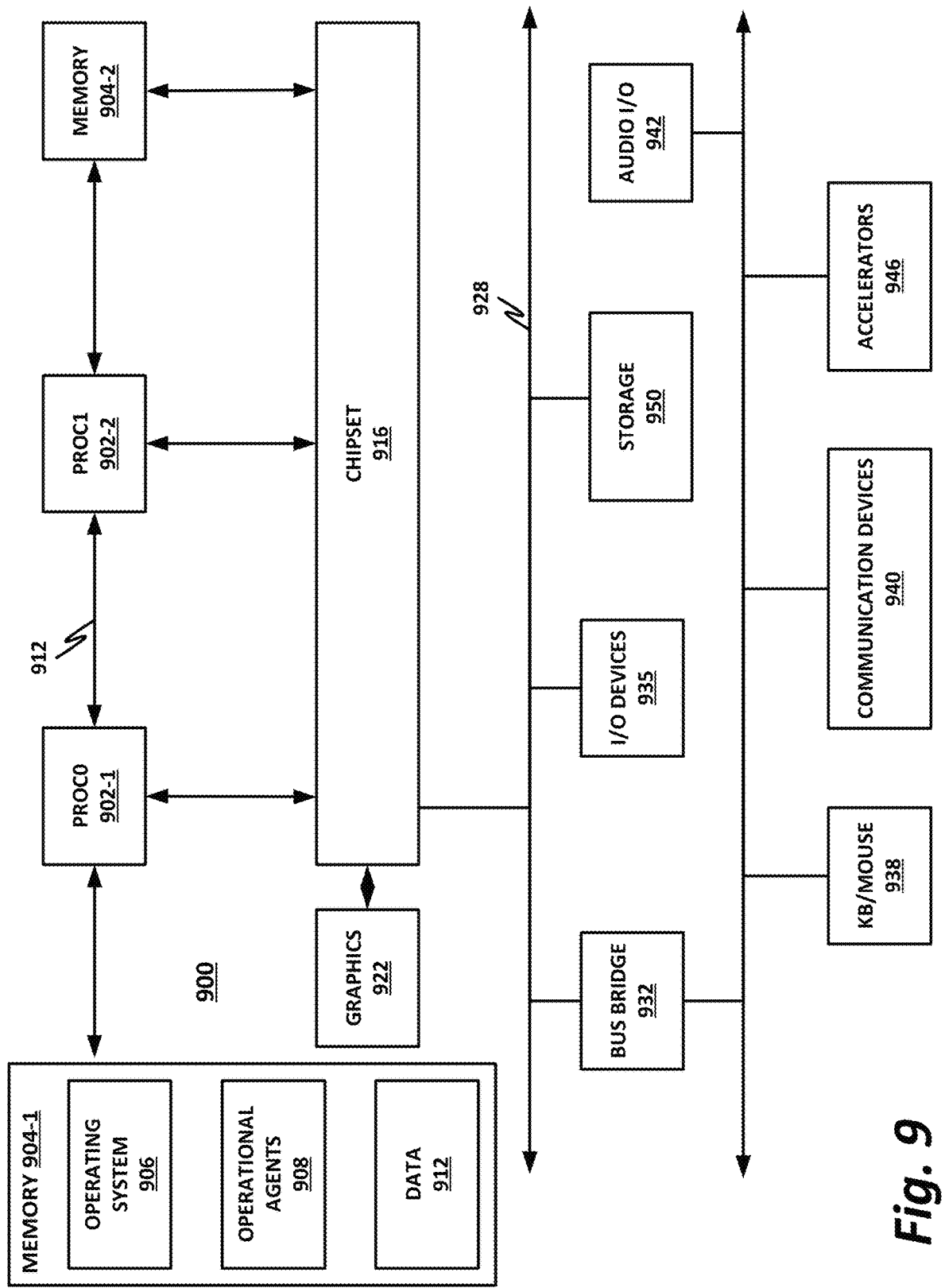
FIG. 9 is a block diagram of selected elements of a hardware platform.

FIG. 9 is a block diagram of a hardware platform 900. In at least some embodiments, hardware platform 900 may be configured or adapted to provide visual classification according to binary memory dump, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Figure 11:
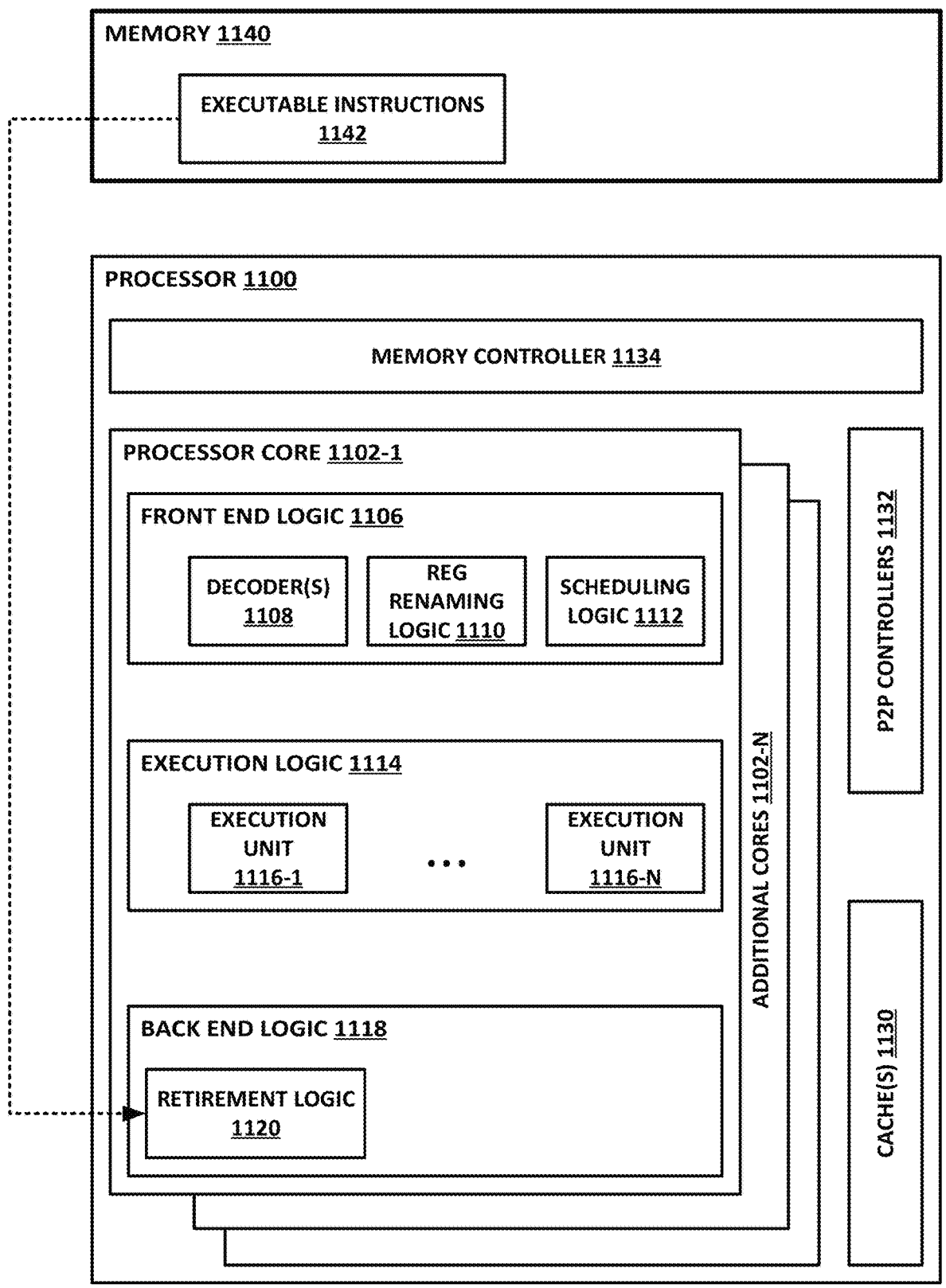
FIG. 11 is a block diagram illustrating selected elements of a processor.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE, but one embodiment is illustrated in FIG. 11. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own GPU.

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, an FPGA programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor (s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10.

Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in ASICs, FPGAs, and other semiconductor chips.

Figure 10:
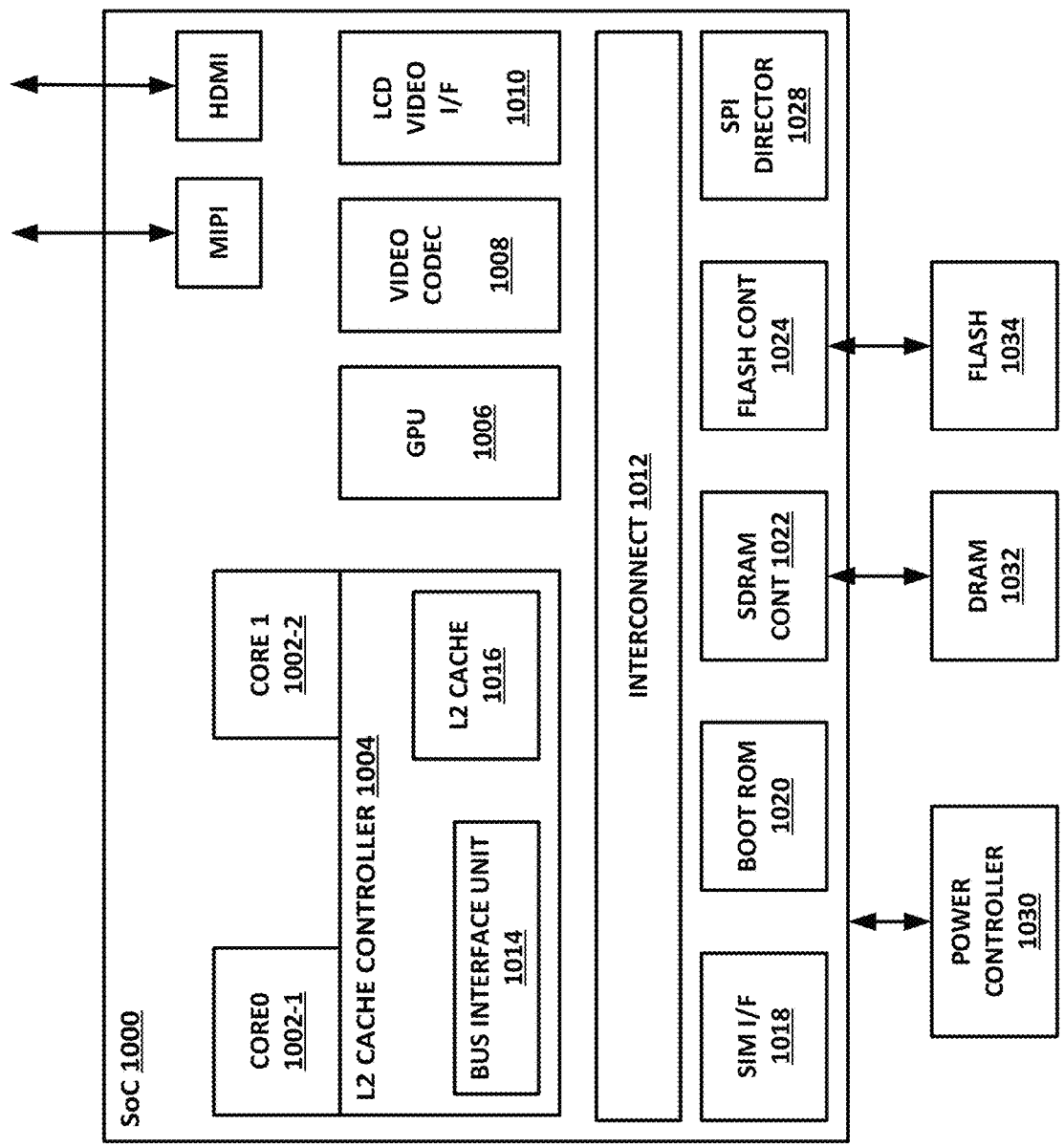
FIG. 10 is a block diagram of selected elements of a system-on-a-chip (SoC).

FIG. 10 is a block illustrating selected elements of an example SoC 1000. In at least some embodiments, SoC 1000 may be configured or adapted to provide visual classification according to binary memory dump, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 11 is a block diagram illustrating selected elements of a processor 1100. In at least some embodiments, processor 1100 may be configured or adapted to provide visual classification according to binary memory dump, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1100 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and nonvolatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple virtual machines (VMs) are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1100 includes one or more processor cores 1102, including core 1102-1-1102-N. Cores 1102 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1100 may include at least one shared cache 1130, which may be treated logically as part of memory 1140. Memory 1140 may include executable instructions 1142, as illustrated. Caches 1130 may be filled according to known caching techniques, and may store instructions and/or data that may be used by one or more components of processor 1100.

Processor 1100 may include an integrated memory controller (MC) 1134, to communicate with memory 1140. Memory controller 1134 may include logic and circuitry to interface with memory 1140, and may also include a cache controller to handle filling and evicting instructions and data to and from cache 1130.

By way of example, each core 1102 may include front-end logic 1106, execution logic 1114, and backend logic 1118.

In the illustrated embodiment, front-end logic 1106 includes an instruction decoder or decoders 1108, register renaming logic 1110, and scheduling logic 1112. Decoder 1108 may decode instructions received. Register renaming logic 1110 may provide register renaming, for example to facilitate pipelining. Scheduling logic 1112 may schedule instruction execution, and may provide out-of-order (OOO) execution. Front-end logic 1106 may fetch incoming instructions, perform various processing (e.g., caching, decoding, branch predicting, etc.), and pass instructions to execution logic 1114.

Execution logic 1114 includes one or more execution units 1116-1-1116-N. Execution units 1116 may include hardware instructions and microcode to carry out the provided instructions.

Backend logic 1118 includes retirement logic 1120. Core 1102 may provide for speculative execution of instructions, branch prediction, and similar. Retirement logic 1120 may be configured to determine which predicted instructions were actually needed by the program flow.

Processor 1100 may also include a PtP controller 1132, which enables connection to an uncore, chipset, Northbridge, Southbridge, or bus, by way of example.

Figure 12:
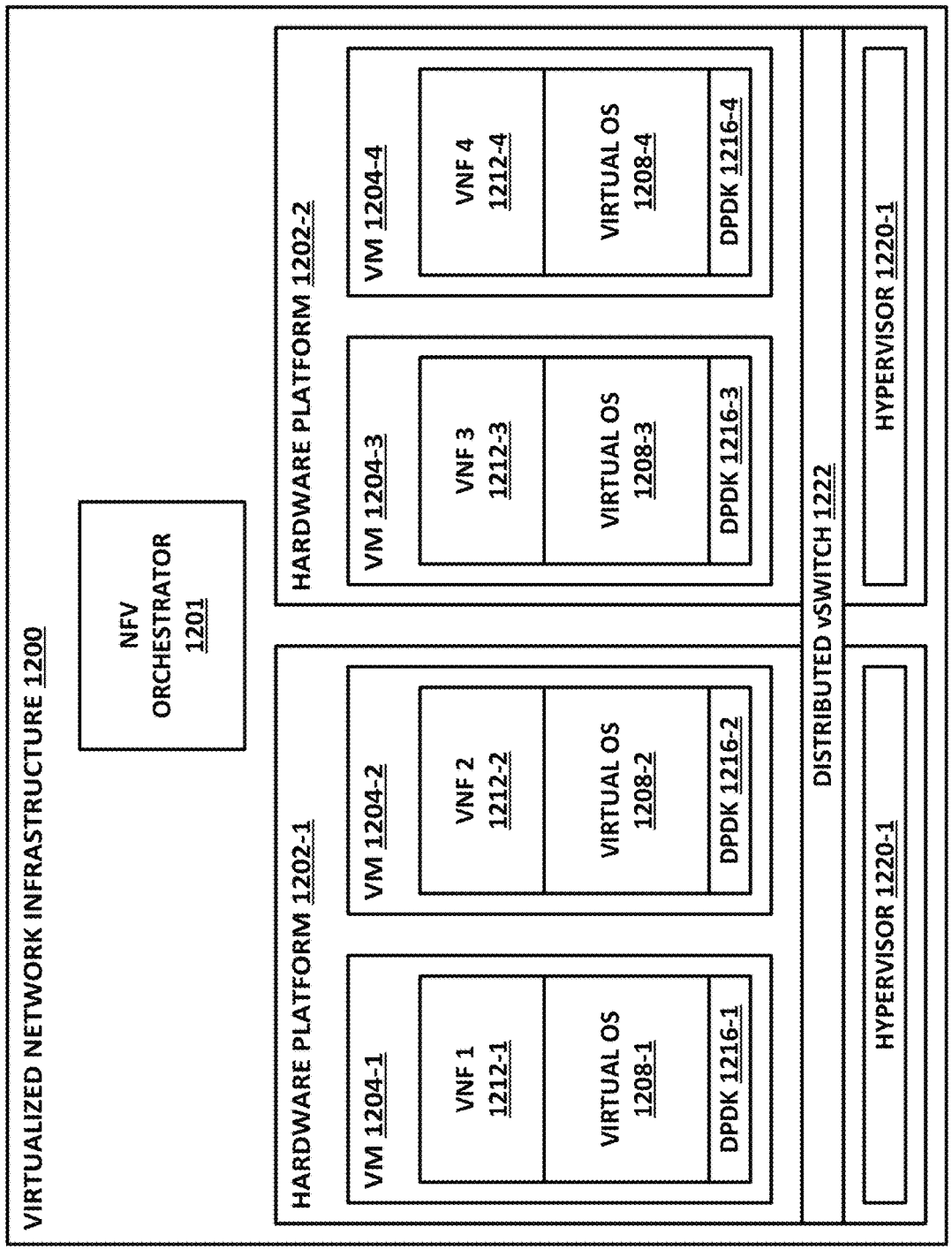
FIG. 12 is a block diagram illustrating selected elements of a network function virtualization (NFV) infrastructure.

FIG. 12 is a block diagram of a network function virtualization (NFV) infrastructure 1200. FIG. 12 illustrates a platform for providing virtualization services. Virtualization may be used in some embodiments to provide one or more features of the present disclosure.

NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1200. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 12, an NFV orchestrator 1201 manages a number of the VNFs 1212 running on an NFVI 1200. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1201 a valuable system resource. Note that NFV orchestrator 1201 may provide a browser-based or graphical configuration interface, and in some embodiments may be integrated with SDN orchestration functions.

Note that NFV orchestrator 1201 itself may be virtualized (rather than a special-purpose hardware appliance). NFV orchestrator 1201 may be integrated within an existing SDN system, wherein an operations support system (OSS) manages the SDN. This may interact with cloud resource management systems (e.g., OpenStack) to provide NFV orchestration. An NFVI 1200 may include the hardware, software, and other infrastructure to enable VNFs to run. This may include a hardware platform 1202 on which one or more VMs 1204 may run. For example, hardware platform 1202-1 in this example runs VMs 1204-1 and 1204-2. Hardware platform 1202-2 runs VMs 1204-3 and 1204-4. Each hardware platform may include a hypervisor 1220, virtual machine manager (VMM), or similar function, which may include and run on a native (bare metal) operating system, which may be minimal so as to consume very few resources.

Hardware platforms 1202 may be or comprise a rack or several racks of blade or slot servers (including, e.g., processors, memory, and storage), one or more data centers, other hardware resources distributed across one or more geographic locations, hardware switches, or network interfaces. An NFVI 1200 may also include the software architecture that enables hypervisors to run and be managed by NFV orchestrator 1201.

Running on NFVI 1200 are a number of VMs 1204, each of which in this example is a VNF providing a virtual service appliance. Each VM 1204 in this example includes an instance of the Data Plane Development Kit (DPDK), a virtual operating system 1208, and an application providing the VNF 1212.

Virtualized network functions could include, as nonlimiting and illustrative examples, firewalls, intrusion detection systems, load balancers, routers, session border controllers, DPI services, network address translation (NAT) modules, or call security association.

The illustration of FIG. 12 shows that a number of VNFs 1204 have been provisioned and exist within NFVI 1200. This FIGURE does not necessarily illustrate any relationship between the VNFs and the larger network, or the packet flows that NFVI 1200 may employ.

The illustrated DPDK instances 1216 provide a set of highly-optimized libraries for communicating across a virtual switch (vSwitch) 1222. Like VMs 1204, vSwitch 1222 is provisioned and allocated by a hypervisor 1220. The hypervisor uses a network interface to connect the hardware platform to the data center fabric (e.g., an HFI). This HFI may be shared by all VMs 1204 running on a hardware platform 1202. Thus, a vSwitch may be allocated to switch traffic between VMs 1204. The vSwitch may be a pure software vSwitch (e.g., a shared memory vSwitch), which may be optimized so that data are not moved between memory locations, but rather, the data may stay in one place, and pointers may be passed between VMs 1204 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1222 is illustrated, wherein vSwitch 1222 is shared between two or more physical hardware platforms 1202.

Figure 13:
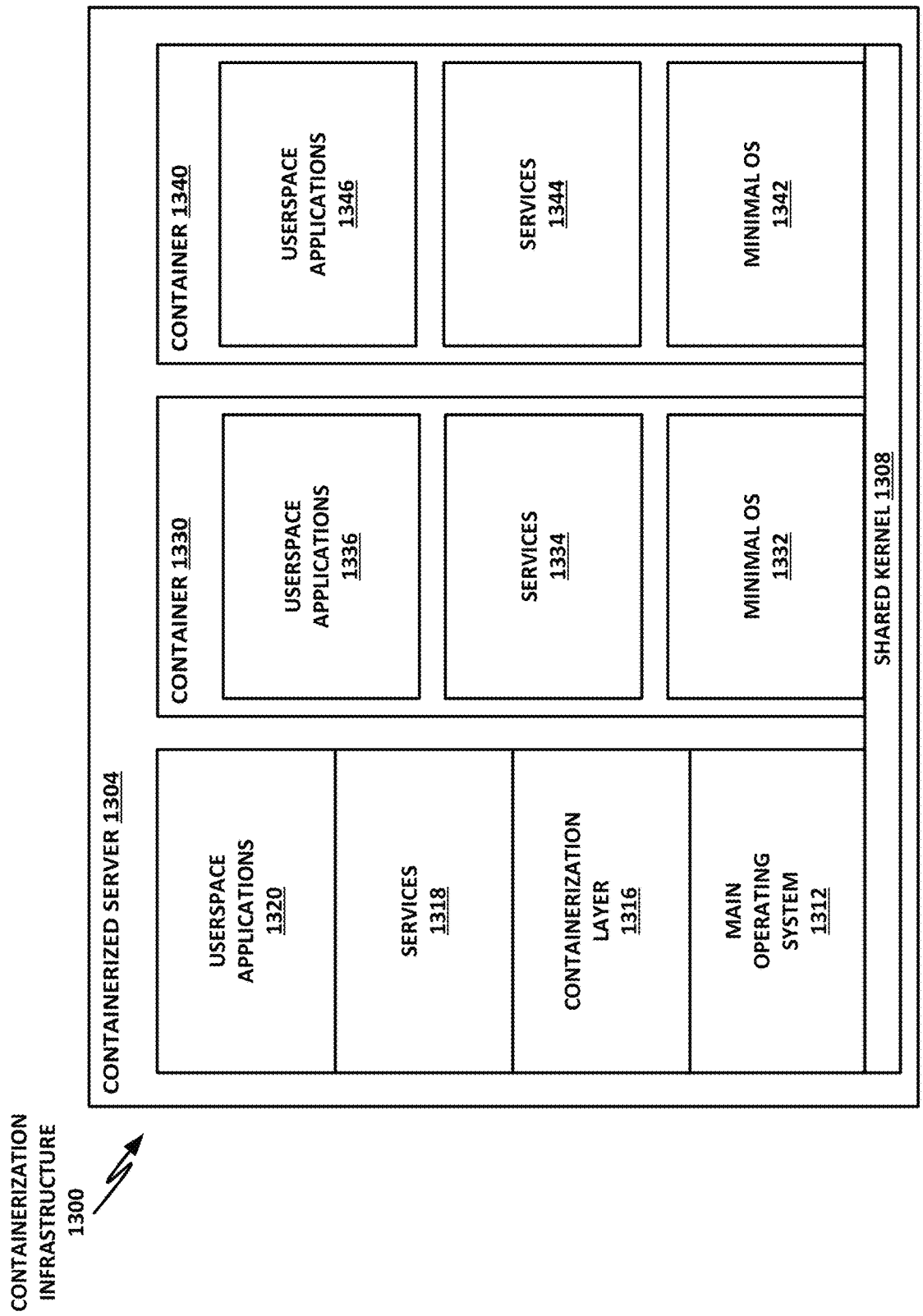
FIG. 13 is a block diagram illustrating selected elements of a containerization infrastructure.

FIG. 13 is a block diagram of selected elements of a containerization infrastructure 1300. FIG. 13 illustrates a platform for providing containerization services. Containerization may be used in some embodiments to provide one or more features of the present disclosure.

Like virtualization, containerization is a popular form of providing a guest infrastructure.

Containerization infrastructure 1300 runs on a hardware platform such as containerized server 1304. Containerized server 1304 may provide a number of processors, memory, one or more network interfaces, accelerators, and/or other hardware resources.

Running on containerized server 1304 is a shared kernel 1308. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1308 is main operating system 1312. Commonly, main operating system 1312 is a Unix or Linux-based operating system, although containerization infrastructure is also available for other types of systems, including Microsoft Windows systems and Macintosh systems. Running on top of main operating system 1312 is a containerization layer 1316. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1312 may also include a number of services 1318, which provide services and interprocess communication to userspace applications 1320.

Services 1318 and userspace applications 1320 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1312, they inherit the same file and resource access permissions as those provided by shared kernel 1308. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1304, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1304).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1304 hosts two containers, namely container 1330 and container 1340.

Container 1330 may include a minimal operating system 1332 that runs on top of shared kernel 1308. Note that a minimal operating system is provided as an illustrative example, and is not mandatory. In fact, container 1330 may perform as full an operating system as is necessary or desirable. Minimal operating system 1332 is used here as an example simply to illustrate that in common practice, the minimal operating system necessary to support the function of the container (which in common practice, is a single or monolithic function) is provided.

On top of minimal operating system 1332, container 1330 may provide one or more services 1334. Finally, on top of services 1334, container 1330 may also provide a number of userspace applications 1336, as necessary.

Container 1340 may include a minimal operating system 1342 that runs on top of shared kernel 1308. Note that a minimal operating system is provided as an illustrative example, and is not mandatory. In fact, container 1340 may perform as full an operating system as is necessary or desirable. Minimal operating system 1342 is used here as an example simply to illustrate that in common practice, the minimal operating system necessary to support the function of the container (which in common practice, is a single or monolithic function) is provided.

On top of minimal operating system 1342, container 1340 may provide one or more services 1344. Finally, on top of services 1344, container 1340 may also provide a number of userspace applications 1346, as necessary.

Using containerization layer 1316, containerized server 1304 may run a number of discrete containers, each one providing the minimal operating system and/or services necessary to provide a particular function. For example, containerized server 1304 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 14:
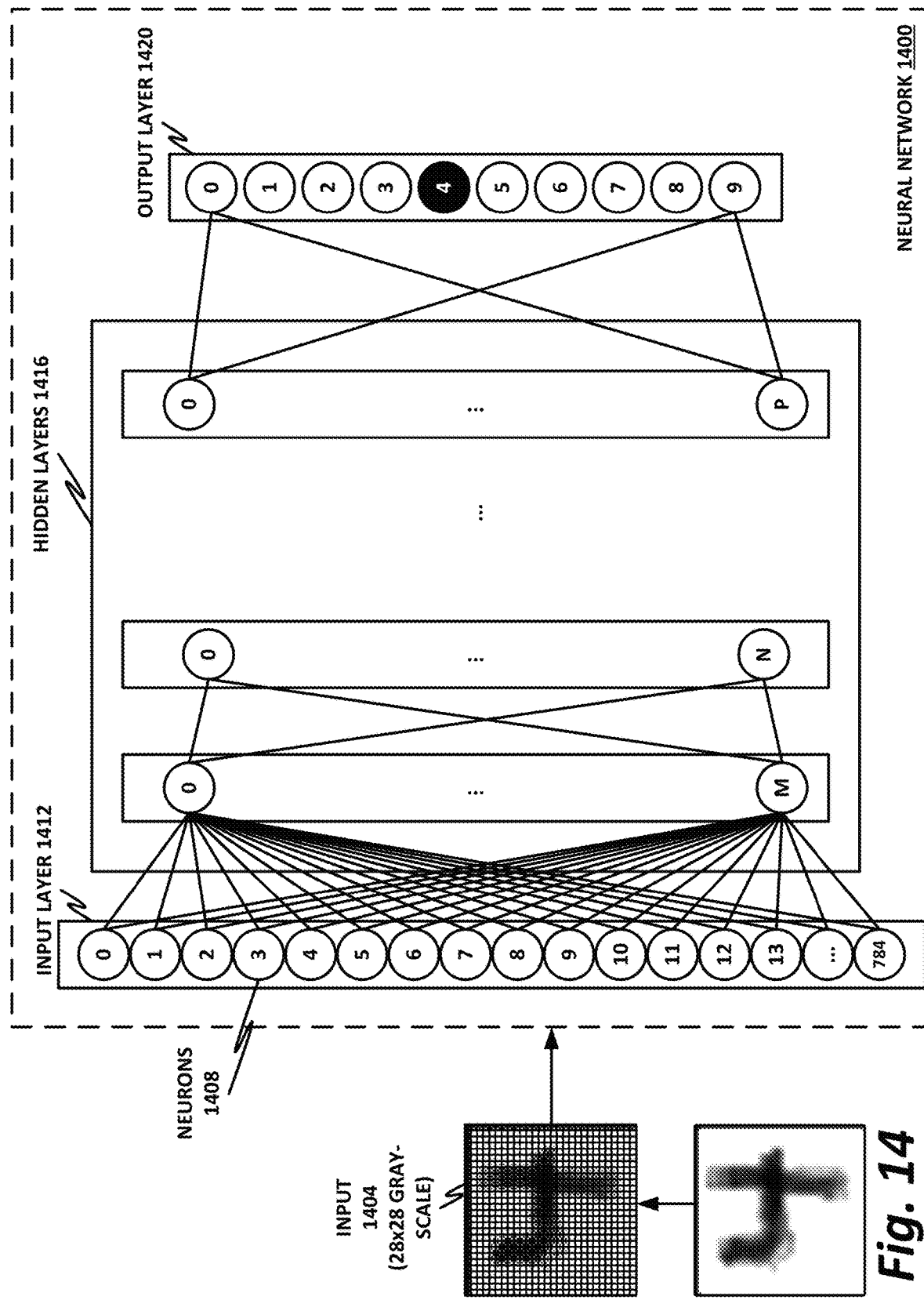
FIG. 14 is an illustrating of machine learning according to a "textbook" problem with real-world applications.
Figure 15:
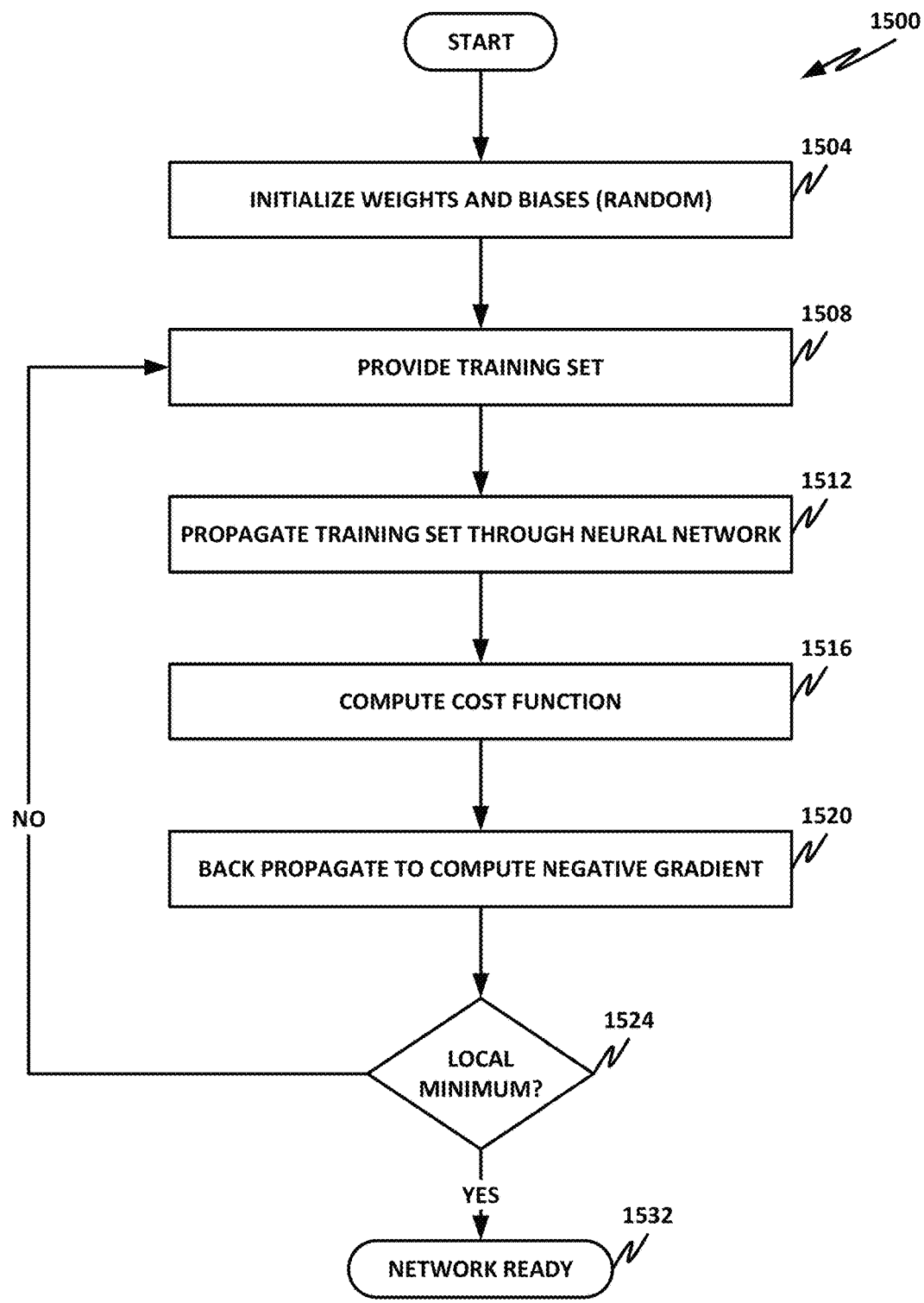
FIG. 15 is a flowchart of a method that may be used to train a neural network.
Figure 16:
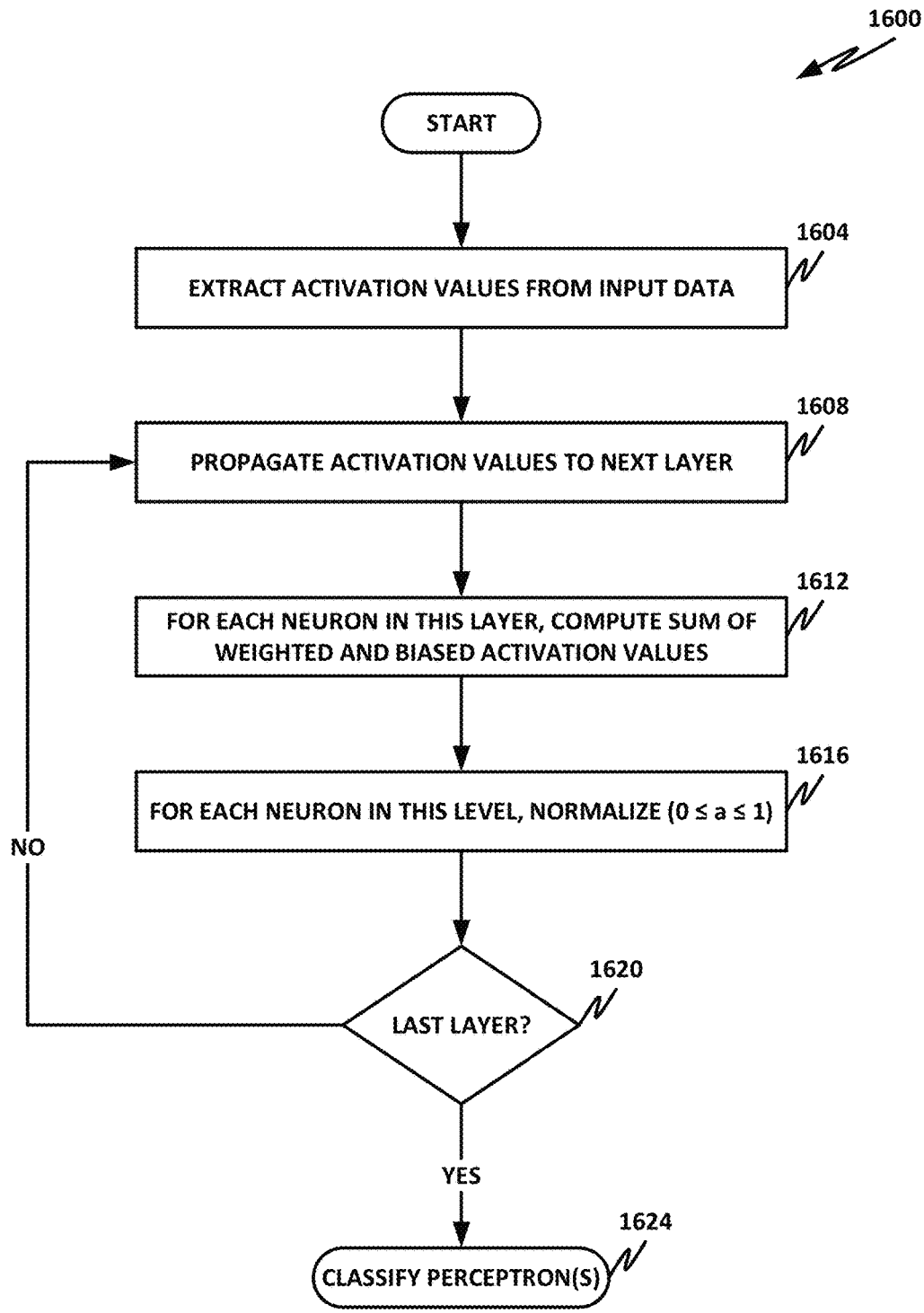
FIG. 16 is a flowchart of a method of using a neural network to classify an object.

FIGS. 14-16 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 14 illustrates machine learning according to a "textbook" problem with real-world applications. In this case, a neural network 1400 is tasked with recognizing characters. To simplify the description, neural network 1400 is tasked only with recognizing single digits in the range of 0 through 9. These are provided as an input image 1404. In this example, input image 1404 is a 28×28-pixel 8-bit grayscale image. In other words, input image 1404 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1400 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1400 includes an input layer 1412 and an output layer 1420. In principle, input layer 1412 receives an input such as input image 1404, and at output layer 1420, neural network 1400 "lights up" a perceptron that indicates which character neural network 1400 thinks is represented by input image 1404.

Between input layer 1412 and output layer 1420 are some number of hidden layers 1416. The number of hidden layers 1416 will depend on the problem to be solved, the available compute resources, and other design factors. In general, the more hidden layers 1416, and the more neurons per hidden layer, the more accurate the neural network 1400 may become. However, adding hidden layers and neurons also increases the complexity of the neural network, and its demand on compute resources. Thus, some design skill is required to determine the appropriate number of hidden layers 1416, and how many neurons are to be represented in each hidden layer 1416.

Input layer 1412 includes, in this example, 784 "neurons" 1408. Each neuron of input layer 1412 receives information from a single pixel of input image 1404. Because input image 1404 is a 28×28 grayscale image, it has 784 pixels. Thus, each neuron in input layer 1412 holds 8 bits of information, taken from a pixel of input layer 1404. This 8-bit value is the "activation" value for that neuron.

Each neuron in input layer 1412 has a connection to each neuron in the first hidden layer in the network. In this example, the first hidden layer has neurons labeled 0 through M. Each of the M+1 neurons is connected to all 784 neurons in input layer 1412. Each neuron in hidden layer 1416 includes a kernel or transfer function, which is described in greater detail below. The kernel or transfer function determines how much "weight" to assign each connection from input layer 1412. In other words, a neuron in hidden layer 1416 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1416, until they reach the last layer, which has P+1 neurons labeled 0 through P. Each of these P+1 neurons has a connection to each neuron in output layer 1420. Output layer 1420 includes a number of neurons known as perceptrons that compute an activation value based on their weighted connections to each neuron in the last hidden layer 1416. The final activation value computed at output layer 1420 may be thought of as a "probability" that input image 1404 is the value represented by the perceptron. For example, if neural network 1400 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1416 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a non-trivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (a) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1412) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \vdots & \ddots & \vdots \\ w_{(k,0)} & \cdots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma(Wa^{(0)} + b)$$

Neural connections and activation values are propagated throughout the hidden layers 1416 of the network in this way, until the network reaches output layer 1420. At output layer 1420, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1420 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights-and-biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 15 is a flowchart of a method 1500. Method 1500 may be used to train a neural network, such as neural network 1400 of FIG. 14.

In block 1504, the network is initialized. Initially, neural network 1400 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1508, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1508, the initial training set is provided to the neural network. Alternatively, the full training set could be used in each iteration.

In block 1512, the training data are propagated through the neural network. Because the initial values are random, and are therefore essentially garbage, it is expected that the output will also be a garbage value. In other words, if neural network 1400 of FIG. 14 has not been trained, when input image 1404 is fed into the neural network, it is not expected with the first training set that output layer 1420 will light up perceptron 4. Rather, the perceptrons may have values that are all over the map, with no clear winner, and with very little relation to the number 4.

In block 1516, a cost function is computed as described above. For example, in neural network 1400, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1520, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1524, the system determines whether it has reached a local minimum (e.g., whether the gradient has reached 0 within the threshold). If the local minimum has not been reached, then the neural network has not been adequately trained, and control returns to block 1508 with a new training set. The training sequence continues until, in block 1524, a local minimum has been reached.

Now that a local minimum has been reached and the corrections have been back-propagated, in block 1532, the neural network is ready.

FIG. 16 is a flowchart of a method 1600. Method 1600 illustrates a method of using a neural network, such as network 1400 of FIG. 14, to classify an object.

In block 1604, the network extracts the activation values from the input data. For example, in the example of FIG. 14, each pixel in input image 1404 is assigned as an activation value to a neuron 1408 in input layer 1412.

In block 1608, the network propagates the activation values from the current layer to the next layer in the neural network. For example, after activation values have been extracted from the input image, those values may be propagated to the first hidden layer of the network.

In block 1612, for each neuron in the current layer, the neuron computes a sum of weighted and biased activation values received from each neuron in the previous layer. For example, in the illustration of FIG. 14, neuron 0 of the first hidden layer is connected to each neuron in input layer 1412. A sum of weighted values is computed from those activation values, and a bias is applied.

In block 1616, for each neuron in the current layer, the network normalizes the activation values by applying a function such as sigmoid, ReLU, or some other function.

In decision block 1620, the network determines whether it has reached the last layer in the network. If this is not the last layer, then control passes back to block 1608, where the activation values in this layer are propagated to the next layer.

Returning to decision block 1620, If the network is at the last layer, then the neurons in this layer are perceptrons that provide final output values for the object. In terminal 1624, the perceptrons are classified and used as output values.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A method of detecting computer malware, comprising:
   receiving a compressed binary object for analysis;
   allocating the compressed binary object to a sandbox;
   within the sandbox, unpacking the compressed binary object into an unpacked binary object and loading the unpacked binary object into an executable memory region;
   performing a core dump of the executable memory region; and
   performing a computer vision analysis of the core dump to determine malware characteristics.

2. The method of claim 1, wherein performing the computer vision analysis of the core dump comprises artificial intelligence analysis.

3. The method of claim 1, further comprising converting the core dump to an image.

4. A computing system, comprising:
   a processor;
   a memory; and
   instructions encoded within the memory to instruct the processor to:
   receive a compressed malware sample for analysis;
   cause a sandbox to receive the compressed malware sample, decompress the compressed malware sample into a local memory of the sandbox, and dump the decompressed malware sample to a binary memory image;
   cause the binary memory image to be converted to an image file; and
   cause a neural network to visually inspect the image file, and based on visual inspection, make a determination on whether the compressed malware sample is malicious.

5. The computing system of claim 4, wherein the visual inspection of the image file by the neural network comprises artificial intelligence analysis.

6. The computing system of claim 5, wherein the artificial intelligence analysis comprises computer vision.

7. The computing system of claim 4, wherein the image file is an 8-bit grayscale image.

8. The computing system of claim 4, wherein converting the binary memory image to an image file comprises converting the binary memory image to an 8-bit vector format.

9. The computing system of claim 4, wherein the sandbox runs a native operating system of the compressed malware sample.

10. The computing system of claim 4, wherein unpacking the compressed malware sample into the local memory comprises operating an unpacker.

11. The computing system of claim 10, wherein the unpacker is an operating system-native unpacker.

12. The computing system of claim 4, wherein the compressed malware sample is a compressed Windows portable executable (PE).

13. The computing system of claim 4, wherein the compressed malware sample is a compressed Unix or Linux executable and linkable format (ELF) file.

14. The computing system of claim 4, wherein the compressed malware sample is a Macintosh Mach-O file.

15. A malware analysis system, comprising:
a hardware platform;
a guest infrastructure to run on the hardware platform;
a first guest to operate on the guest infrastructure and provide a sandbox, the sandbox including instructions to receive a compressed object file, extract the compressed object file into guest memory, and dump the guest memory to a binary image; and
a second guest to operate on the guest infrastructure and provide an analyzer, the analyzer including instructions to visually analyze the binary image according to an artificial intelligence subroutine, and determine whether the compressed object file is a malicious file.

16. The malware analysis system of claim 15, wherein the sandbox is a virtual machine.

17. The malware analysis system of claim 16, wherein the virtual machine is a Windows virtual machine.

18. The malware analysis system of claim 17, wherein the guest infrastructure provides containerization.

19. The malware analysis system of claim 15, wherein the sandbox includes a virtual machine and the analyzer includes a container.

* * * * *